Sept. 20, 1927.
J. N. S. WILLIAMS
FILTER
Filed Aug. 11, 1925
1,642,864
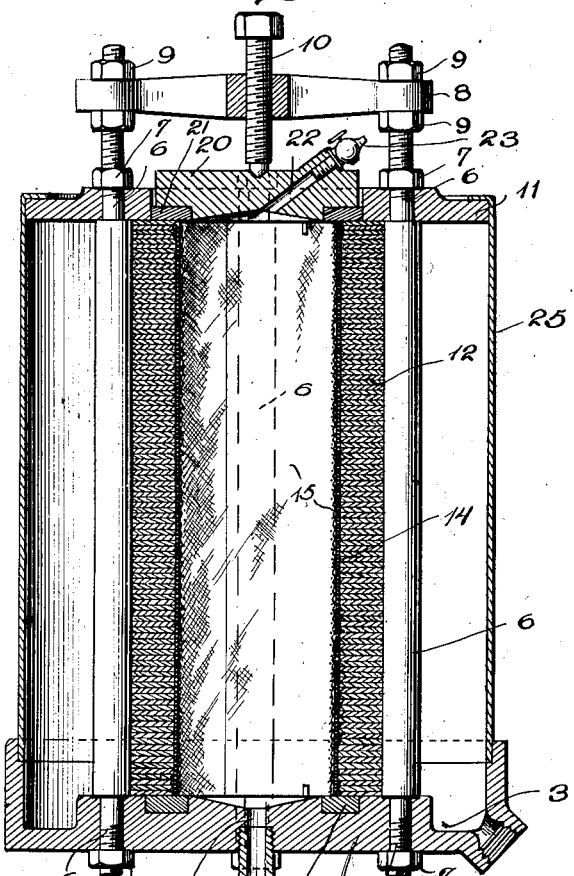
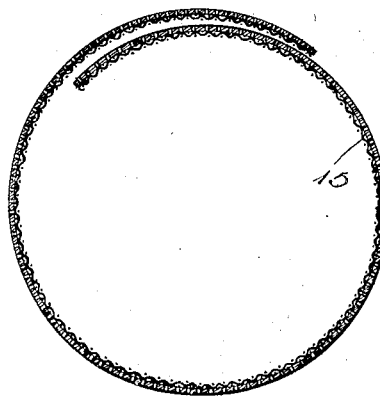
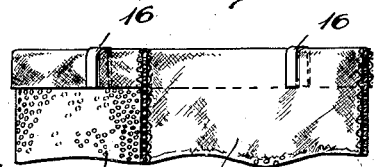
Inventor
J. N. S. Williams

Patented Sept. 20, 1927.

1,642,864

UNITED STATES PATENT OFFICE.

JOHN N. S. WILLIAMS, OF HONOLULU, TERRITORY OF HAWAII.

FILTER.

Application filed August 11, 1925. Serial No. 49,624.

The invention relates to pressure filters for liquids, especially dense syrups, and has for its object to provide a simple and efficient construction that is readily assembled and operated under high pressure without danger of rupturing or impairing the filtering medium, which is preferably composed of paper, parchment, silk, cotton or linen fabric, finely woven metal cloth, or other suitable material, which is secured to a screen or finely perforated metal plate adapted to be rolled into cylindrical form and reinforced by a hollow column composed of stacked rings of thin metal or similar material provided with a multiplicity of passageways, the whole being enclosed in a suitable casing.

The invention is illustrated in the accompanying drawings, in which:—

Fig. 1 is a sectional elevation of the filter.

Fig. 2 is a plan view of the filtering medium and its supporting screen.

Fig. 3 is a broken elevation of the latter, partly in section.

Fig. 4 is a perspective view of the column of stacked rings.

Referring to the drawings, 1 indicates the bottom section of the filter, provided with a central inlet 2, to which is connected a supply pipe 2' and a lateral outlet 3, which also may be connected to a delivery pipe. An annular recess surrounding the inlet opening 2 is adapted to receive a packing washer 4. The other end section of the filter is a ring-shaped member 11, which is secured in proper spaced relation with respect to section 1 by rods or bolts 6 having reduced ends engaging corresponding openings in sections 1 and 11, said reduced ends being provided with screw threads, which receive clamping nuts 7. The upper threaded ends of two of the diametrically opposite rods 6 are extended outwardly to support a yoke 8, which is locked in position by nuts 9, 9, said yoke carrying a set screw 10 engaging a threaded opening in the middle of the yoke.

Disposed centrally and longitudinally of the frame, constituted by the end sections 1 and 11 and the connecting rod 6, is a hollow column consisting of a series of stacked rings 12, preferably made of thin metal or the like, which are provided with a multiplicity of radial channels 13, as illustrated in Fig. 4. The hollow column is held against lateral movement by the four rods 6 and is clamped against longitudinal movement between the end sections 1 and 11.

The primary purpose of the hollow cylindrical column is to afford a rigid support for the filtering medium and thereby prevent the latter being damaged or impaired by the heavy pressure which may be used in forcing the liquid to be filtered through the medium, the multiplicity of channels or passageways 13 permitting the ready escape of the filtered liquid. The filtering medium proper is preferably in the form of a sheet of fabric, such as paper, parchment, silk, cotton, linen or finely woven metal cloth well adapted to remove the finest solid matter from the liquid to be filtered, said filtering medium, indicated at 15, being secured to a sheet of metal 14 provided with a multiplicity of fine perforations, the filtering element 15 being secured to the screen 14 by turning the edges of the fabric 15 over the edges of the screen and securing the fold by U-shaped metal clips, as shown in Fig. 3. The filtering medium and its supporting screen, which are primarily in the form of flat sheets, are then rolled into substantially cylindrical form, as indicated in Figs. 2 and 3, with the lateral edges overlapping, thus forming a flexible screen capable of expansion under internal pressure, and inserted within the hollow column constituted by the stack of rings 12, so that, as the screen 14 expands radially under pressure, it will fit snugly against the interior surface of the hollow column and the more or less fragile filtering fabric 15 will be supported at all points, first, by the flexible screen 14, to which it is attached, and second, by the rigid walls of the hollow column.

In order to facilitate the insertion and removal of the filtering medium 15 and its supporting screen 14, the central opening in the end section 11 of the frame is of larger diameter than the opening in the column of stacked rings, said opening being adapted to receive the cap or closure element 20, which fits within the opening and is adapted to compress a packing washer 21, resting upon the upper end of the hollow column, said closure being held in clamping relation against the packing ring 21 by means of the set screw 10 carried by the yoke 8. The closure 20 is preferably provided with a vent opening 22 provided with a suitable petcock or relief-valve 23.

A suitable shell or casing 25 is adapted to be slipped over the upper end section 11 and to engage an annular flange on the lower end section 1, the shell or casing being readily removable to afford access to the interior of the filter for cleaning, adjustment, or repair thereof.

With an apparatus constructed as described, it is possible to effect the filtering operations under pressure of 300 lbs. to the square inch or more without danger of rupturing or impairing relatively fine and fragile fabric filtering media of the character hereinbefore indicated. To apply the filtering medium and its supporting screen, the latter is rolled into substantially cylindrical form and inserted within the opening of the supporting column formed by the rings 12. The packing ring 21 and closure 20 are then placed in position and slightly forced downward by set screw 10 to expand packing washer 21, to form a liquid tight seal with the periphery of the central opening in the top section 11 and with the ends of the column of stacked rings 12 and screen 14, a liquid tight seal between the lower ends of the column and the screen being effected by the washer 4 in the bottom section 1. In order to set the flexible screen 14, carrying the filtering medium 15, firmly against the interior surface of the supporting column, a jet of compressed air, or other suitable fluid pressure medium, is admitted through inlet 2, which will expand the flexible screen to cause the same to hug tightly the interior walls of the column. After this has been effected, the screw is set up sufficiently to make a liquid tight joint top and bottom to stand the ultimate pressure under which the filter is to operate, the air vent 22 is opened and the liquid to be filtered is admitted until all of the air or other fluid pressure medium has been displaced through the pet-cock 23, after which the latter is closed and the filtration proceeds, the clear liquid passing through the filtering medium 15, the perforations in screen 14 and the channels or ducts in the rings of the supporting column and being ultimately discharged at the outlet 3.

If the valuables to be recovered are in the effluent, the latter is immediately available for any further operations that may be required. On the other hand, if the valuables are in the residue left on the filtering medium 15, they may be completely recovered by opening the apparatus, removing the flexible screen with the filtering medium attached thereto and stripping the material from the surface of the filtering medium.

What I claim is:

1. A pressure filter comprising an enclosing casing having a central inlet and a lateral outlet, a hollow column of stacked thin rings centrally disposed in said casing and having multiple passageways therethrough, a flexible filtering screen capable of expansion under pressure engaging the interior of the hollow column, a filtering fabric secured to the inner face of said screen, and packing rings disposed between the top and bottom of the casing and the ends of the column and screen.

2. In a pressure filter, a casing comprising end sections and an enclosing shell, a central inlet and a lateral outlet in one of said end sections and a central opening in the other, bolts for holding the end sections in spaced relation, a hollow column of stacked thin rings disposed centrally in said casing and confined between the end sections, a flexible filtering screen capable of expansion under pressure engaging the interior of the column, a filtering fabric secured to the inner face of said screen, a packing ring between one end section and the ends of the column and screen, a closure for the central opening in the other end section, and a packing ring disposed between said closure and the adjacent ends of the column and screen.

3. In a pressure filter, a casing comprising end sections and an enclosing shell, a central inlet and a lateral outlet in one of said end sections and a central opening in the other, bolts for holding the end sections in spaced relation, a hollow column of stacked thin rings disposed centrally in said casing and confined between the end sections, a flexible filtering screen capable of expansion under pressure engaging the interior of the column, a filtering fabric secured to the inner face of said screen, a packing ring between one end section and the ends of the column and screen, a closure for the central opening in the other end section, a yoke carried by two of said bolts, a screw mounted in said yoke engaging said closure to lock the latter in position, and a packing ring disposed between said closure and the adjacent ends of the column and screen.

In testimony whereof I affix my signature.

JOHN N. S. WILLIAMS.